US006870954B1

(12) United States Patent
Gupta

(10) Patent No.: US 6,870,954 B1
(45) Date of Patent: Mar. 22, 2005

(54) METHODS APPARATUS FOR GENERATING SHAPED GRADIENT FILLS

(75) Inventor: Niraj Gupta, New Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 645 days.

(21) Appl. No.: 09/826,488

(22) Filed: Apr. 4, 2001

(51) Int. Cl.[7] ........................... G06K 9/00; G06T 11/20
(52) U.S. Cl. ..................... 382/162; 345/441; 345/606
(58) Field of Search ........................ 382/162, 167, 382/243, 274, 164, 165, 180, 199, 203; 345/426, 441, 581–583, 589–593, 606–610; 358/518–521

(56) References Cited

U.S. PATENT DOCUMENTS 5,850,463 A * 12/1998 Horii .......................... 382/118
6,313,840 B1 * 11/2001 Bilodeau et al. ............ 345/423

FOREIGN PATENT DOCUMENTS

EP          455351 A2 * 11/1991    ........... G06F/15/72

OTHER PUBLICATIONS

Adobe® Illustrator® 8.0 Classroom Book, 1998, pp. 235–236, 374.*
Grevera et al. "Shape–Based Interpolation of Multidimensional Grey–Level Images," IEEE T. Medical Imaging, V. 15, No. 6, Dec. 1996, pp. 881–892.*
Bertalmio et al., "Image Inpainting," SIGGRAPH 2000, Jul. 2000, pp. 417–424.*
Adobe Systems Incorporated, Adobe Photoshop 5.0 User Guide, pp. 207–210, ©1998 Adobe System Incorporated.
Wendy Peck, "Color Power with Gradient Fills", and "Type Right for a Pro Look," http://www.webreference.com/graphics/column27/, May 27, 2000.
Wendy Peck, "Vector Gradient Fills," http://www.webreference.com/graphics/column28/, Jun. 25, 2000.
Wendy Peck, "Vector Gradient Fills 2," http://www.webreference.com/graphics/column29/, Jul. 5, 2000.

* cited by examiner

Primary Examiner—Bhavesh M. Mehta
Assistant Examiner—Yubin Hung
(74) Attorney, Agent, or Firm—Fish & Richardson P.C.

(57) ABSTRACT

Computer-implemented methods and computer program apparatus, for implementing techniques for shading selected regions of an image. These include receiving an input selecting a region to be filled, receiving an input defining a gradient specifying a color transition to be applied between a starting position and an ending position, and applying the gradient between the starting position and the ending position to assign, based on the shape of the selected region, a color for each of a plurality of points located inside an outline defining the region's shape. In preferred embodiments, the gradient is applied by identifying, for each point in the selected region, a color interpolation vector extending from the starting position through the point to the ending position and intersecting the outline at one or more intersection points, and assigning a color for the point based on its position along the color interpolation vector.

41 Claims, 8 Drawing Sheets

(3 of 8 Drawing Sheet(s) Filed in Color)

METHODS APPARATUS FOR GENERATING SHAPED GRADIENT FILLS

BACKGROUND

This invention relates to image processing techniques for smoothly shading objects and/or regions in an image. Conventional image processing computer applications provide a number of image processing techniques. Commercially available applications such as Photoshop® and Illustrator®, available from Adobe Systems Incorporated, of San Jose, Calif., implement gradient fill techniques for providing smooth color transitions along a vector from one color to another within a selected region or object in an image. Thus, a gradient fill can be considered a graduated blend or transition between two or more colors (or tints or shades of a color).

Known gradient fill techniques can be divided into the following categories. First, in linear or axial gradients color varies between specified boundary colors along a line between starting and ending coordinates (called the gradient axis), forming a series of isochromal lines (lines of the same color in the transition) extending infinitely (at least within the bounds of the object or region to be filled) in directions perpendicular to the gradient axis. In a radial gradient, by contrast, color varies along the radial direction extending out from the origin (typically, the object's center), forming a series of concentric circles with each point on a given circle sharing the same color in the transition. Some applications provide a variant of the radial gradient known as a diamond gradient, in which color varies radially between concentric squares or diamonds. Finally, in an angular gradient, color varies along the angular direction around the origin, with all points on a given ray extending out from the origin sharing the same color in the transition.

In general, these conventional techniques apply gradient fills within a bounding box of the object or region to be filled. They do not, however, provide a means for using the geometry of the selected region or object to guide the application of gradient fills.

SUMMARY

The invention provides methods and apparatus, including computer program apparatus for performing gradient fills based at least in part on the geometry of a region or object to be filled, which will be referred to as "shaped gradient fills" or "shape gradients".

In general, in one aspect, the invention features computer-implemented methods and apparatus, including computer program apparatus, implementing techniques for processing an image. The techniques include receiving an input selecting a region to be filled (including, e.g., a vector object, a user selection, or other selected region of an image), receiving an input defining a gradient specifying a color transition to be applied between a starting position and an ending position, and applying the gradient between the starting position and the ending position to assign, based on the shape of the selected region, a color for each of a plurality of points located inside an outline defining the region's shape.

Particular implementations can include one or more of the following features. Applying the gradient can include, for each of a plurality of points located inside the outline, (i) identifying a color interpolation vector extending from the starting position through the point to the ending position, such that the color interpolation vector intersects the outline at one or more intersection points, and (ii) assigning a color for the point based on the point's position along the color interpolation vector. The selected region can have a regular or irregular shape. The shape of the selected region can be user-defined. The gradient can be a linear gradient or a radial gradient. The starting position can be a point located inside or outside of the outline. The starting position can be a line that intersects or does not intersect the outline. The starting position can be a start outline defining a starting shape. The starting position can be user-defined. The ending position can include at least a portion of the outline. For linear gradients, the gradient can be defined along a gradient axis extending from the starting position to the ending position, and the color interpolation vector can be parallel to the gradient axis. For radial gradients, the starting position can be a point and the color interpolation vector can extend radially from the starting position. Assigning a color for the point can include defining a gradient length for the color interpolation vector based on a distance between the starting position and at least one intersection point, defining a gradient interpolation parameter for the point by applying the defined gradient to the gradient length, and assigning a color for the point based on the gradient interpolation parameter. The gradient interpolation parameter for a point can represent the point's position along the color interpolation vector.

In general, in another aspect, the invention features computer-implemented methods and computer program apparatus implementing techniques for applying a radial gradient to shade a selected region in an image. The techniques include receiving an input selecting a region to be filled, the region having a shape defined by an outline, receiving an input defining a color transition to be applied between an origin in the image and the outline, and applying a radial gradient to shade the selected region by (i) identifying for each point within the outline a color interpolation vector extending from the origin through the point to the outline, such that the color interpolation vector intersects the outline at one or more intersection points, and (ii) assigning a color for the point based on the point's position along the color interpolation vector.

In general, in another aspect, the invention features computer-implemented methods and computer program apparatus implementing techniques for applying a linear gradient to shade a selected region in an image. The techniques include receiving an input selecting in an image a region to be filled, the region having a shape defined by an outline, receiving an input defining a gradient axis extending from a starting position in the image to a portion of the outline, and a color transition to be applied along the gradient axis, and applying a linear gradient to shade at least a portion of the object by (i) identifying for each point within the outline a color interpolation vector extending from the starting position through the point to the outline on a line parallel to the gradient axis, such that the color interpolation vector intersects the outline at one or more intersection points, and (ii) assigning a color for the point based on the point's position along the color interpolation vector.

The details of one or more embodiments of the invention are set forth in the accompanying drawings and the description below. Other features, objects, and advantages of the invention will be apparent from the description and drawings, and from the claims.

DESCRIPTION OF DRAWINGS

The file of this patent contains at least one drawing executed in color. Copies of this patent with color drawing (s) will be provided by the Patent and Trademark Office upon request and payment of the necessary fee.

Like reference symbols in the various drawings indicate like elements.

DETAILED DESCRIPTION

Figure 1:
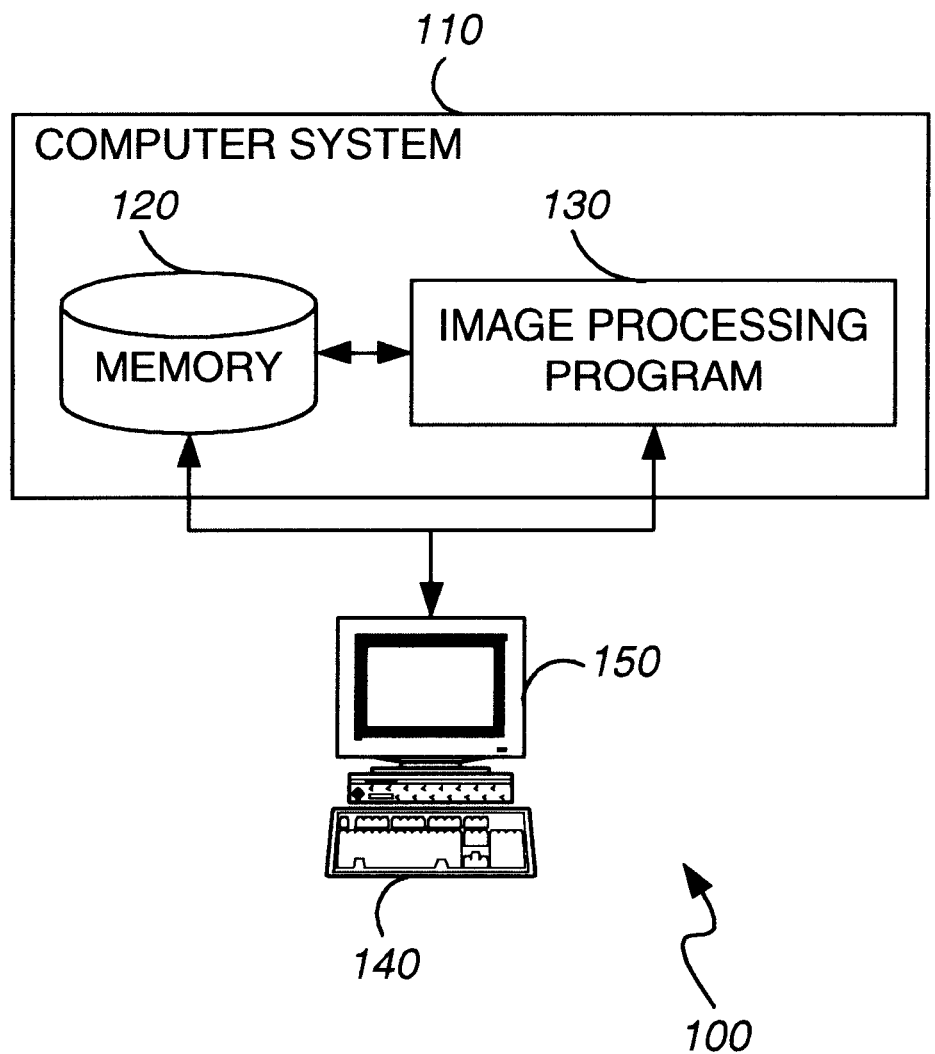
FIG. 1 is a block diagram illustrating an image processing system suitable for implementing a shaped gradient fill operation.

FIG. 1 illustrates an image processing system 100 that includes a general-purpose programmable digital computer system 110 of conventional construction, including a memory 120 and a processor for running an image processing program 130. Image processing system 100 also includes input devices 140, such as a keyboard, mouse or digitizing pen, and output devices such as a display monitor 150. Optionally, image processing system 100 also includes conventional communications hardware and software by which computer system 110 can be connected to other computer systems, such as over a network.

Figure 2:
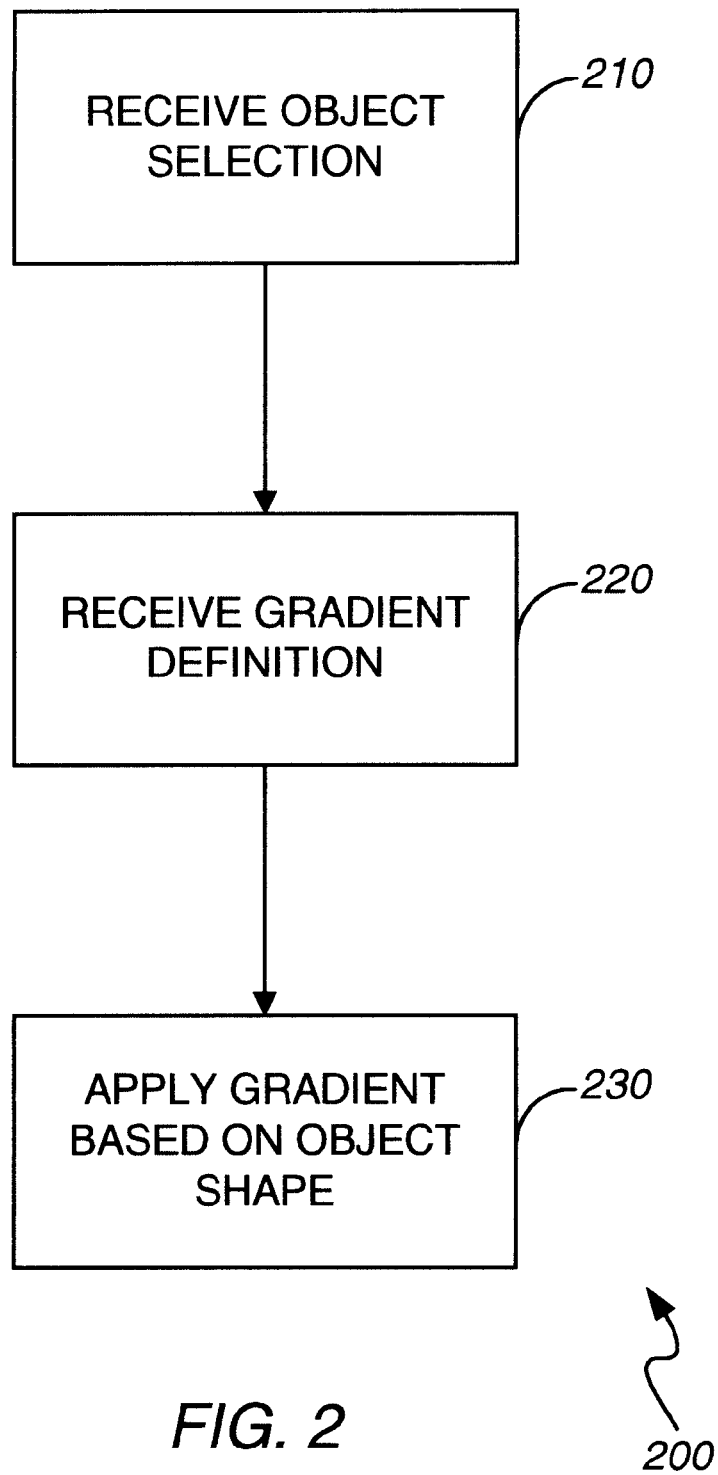
FIG. 2 is a flow diagram illustrating a general method for implementing a shaped gradient fill operation.

FIG. 2 illustrates a method 200 for performing a shaped gradient fill operation suitable for implementation in image processing system 100. The method begins when system 100, which is running an image processing program 130, receives an input selecting an area to be filled (step 210)—for example, when a user employs a mouse or digitizing pen 140 to select a region or object in an image displayed on a monitor 150. The area to be filled can be any area in an image that is or can be demarcated by an outline, including, e.g., vector objects in vector based packages such as Adobe Illustrator®, or simply selected areas (defined, e.g., using one of various selection tools) in images in raster-based systems such as Adobe Photoshope®. The user selects an area to fill by, e.g., selecting a vector object defined by one or more curves or using a selection tool to outline a desired region of an image, which may or may not conform to the boundaries of "objects" depicted in the raster image. In this specification, the terms "object" and "selected region" may be used interchangeably and should be understood to refer to the area to be filled, without being limited to a particular image processing application or type of application.

Figure 6:
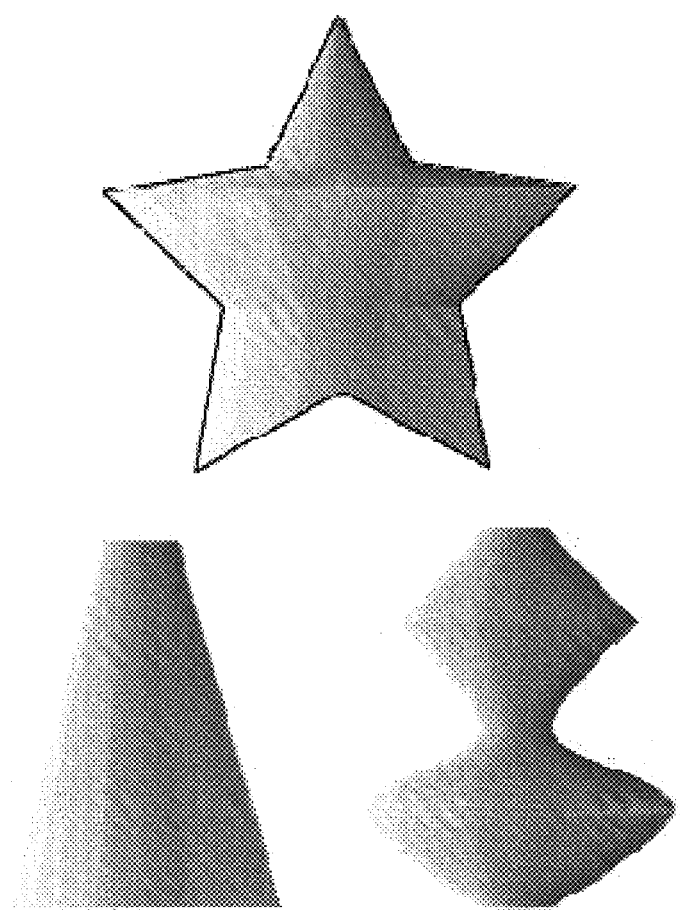
FIG. 6 depicts a number of objects filled using a linear shape gradient.
Figure 7:
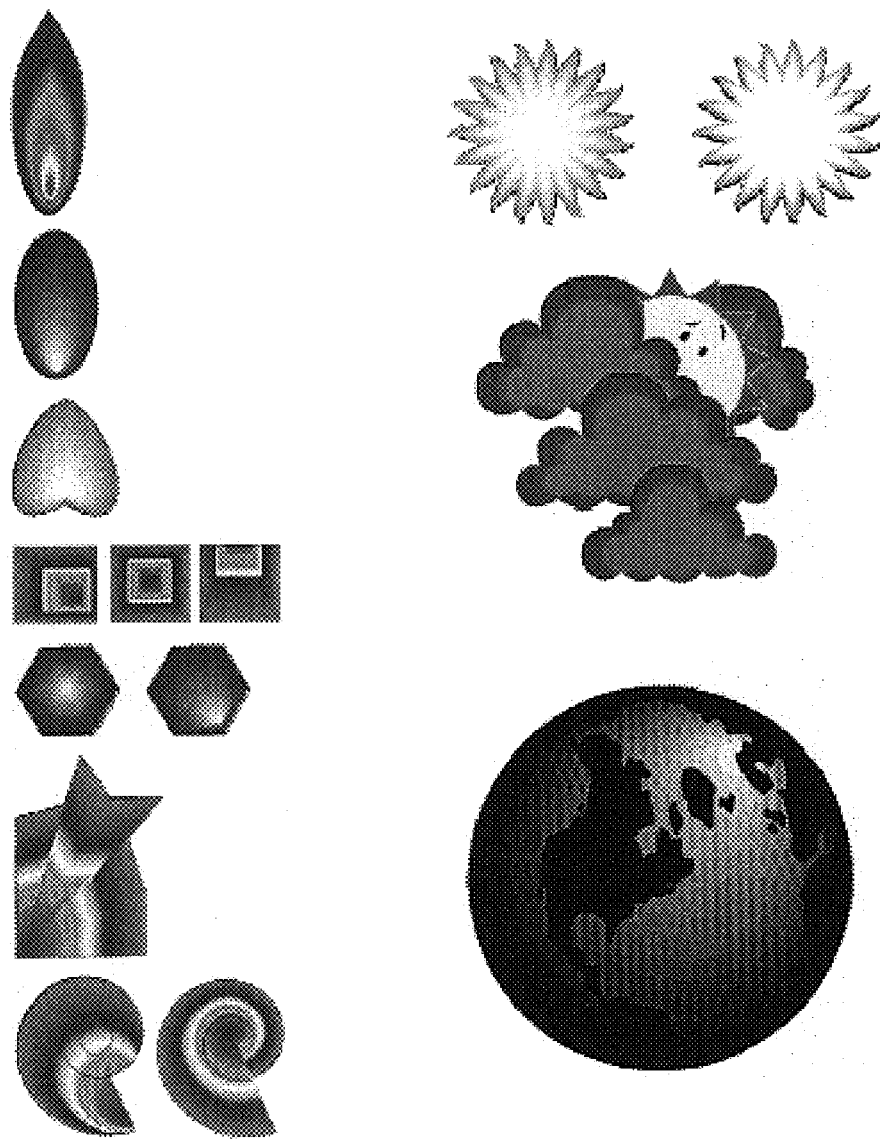
FIG. 7 illustrates a number of objects filled using a radial shape gradient.
Figure 8:
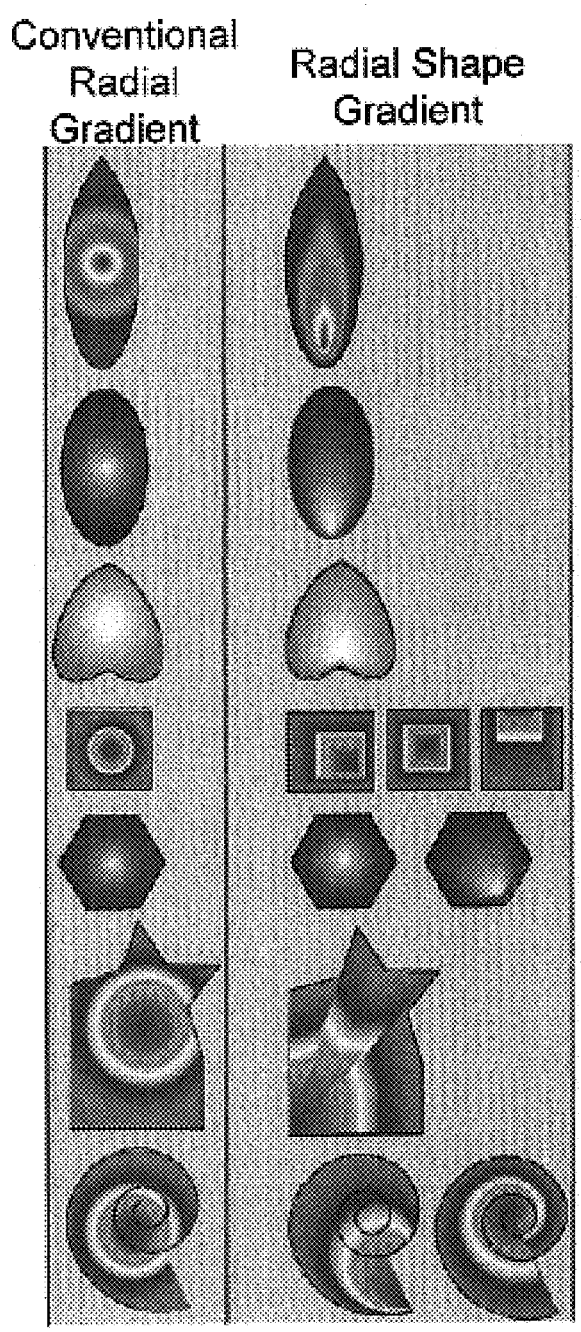
FIG. 8 illustrates a number of objects filled using conventional and shaped radial gradients.

As illustrated in FIGS. 3A–3D, objects 300, 305, 310 and 315 preferably have shapes defined by an object outline 320. As these figures illustrate, the object has a shape that can be any regular or irregular shape (including user-defined regular or irregular shapes), including open shapes as well as closed shapes. Several additional examples of appropriate shapes are shown in FIGS. 6, 7 and 8, which are discussed in more detail below.

System 100 receives an input defining a gradient (step 220), which generally includes information defining a graduated color blend or transition (which, as used in this specification, may include a gray scale blend or transition) to be applied between starting and ending positions in the image. The input can specify a gradient type, such as a radial gradient or a linear gradient. The input can also specify gradient parameters, which can include, for example, two or more colors between (or through) which the gradient will be applied, a starting position in the image, an ending position in the image and the like. In one implementation, system 100 prompts the user to input appropriate parameters based on the specified gradient type. Alternatively, the gradient type can be specified implicitly, based on input gradient parameters.

The starting position can be one or more points in the image and can encompass a single point (which can be referred to as the gradient origin) or multiple points—for example, a line that includes a portion of the object outline or that forms a second outline defining a shape. The starting position can be located inside of, outside of, on or across the object outline. Thus, for a typical radial shape gradient, a starting position can be a point 325 located inside or outside of the object outline (or on the outline itself), from which the gradient will radiate. Alternatively, a radial gradient starting position can also encompass multiple points in the image, such as a set of points, a line or a second outline defining a shape 330. Similarly, the starting position for a linear shape gradient can be a portion 335 of the object outline, or some other line (or curve) 340, such as a line input by the user, which may or may not intersect the object outline. Typically, the ending position will correspond to some or all of the object outline, although those skilled in the art will recognize that to some extent ending positions and starting positions can be interchangeable and that therefore ending positions can also be specified as points or lines in the image as described above in the context of starting positions.

Figure 3A:
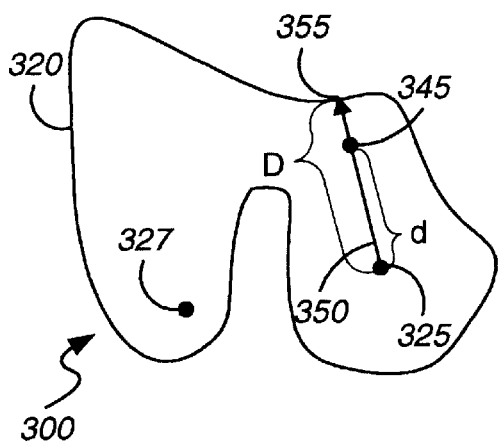
FIGS. 3A–3D illustrate the application of various shape gradients in different objects.
Figure 3B:
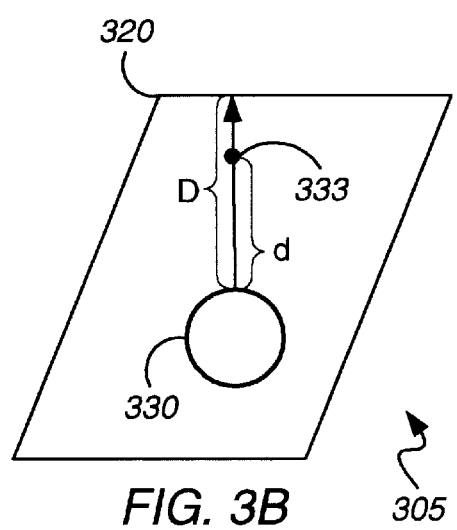
Figure 4:
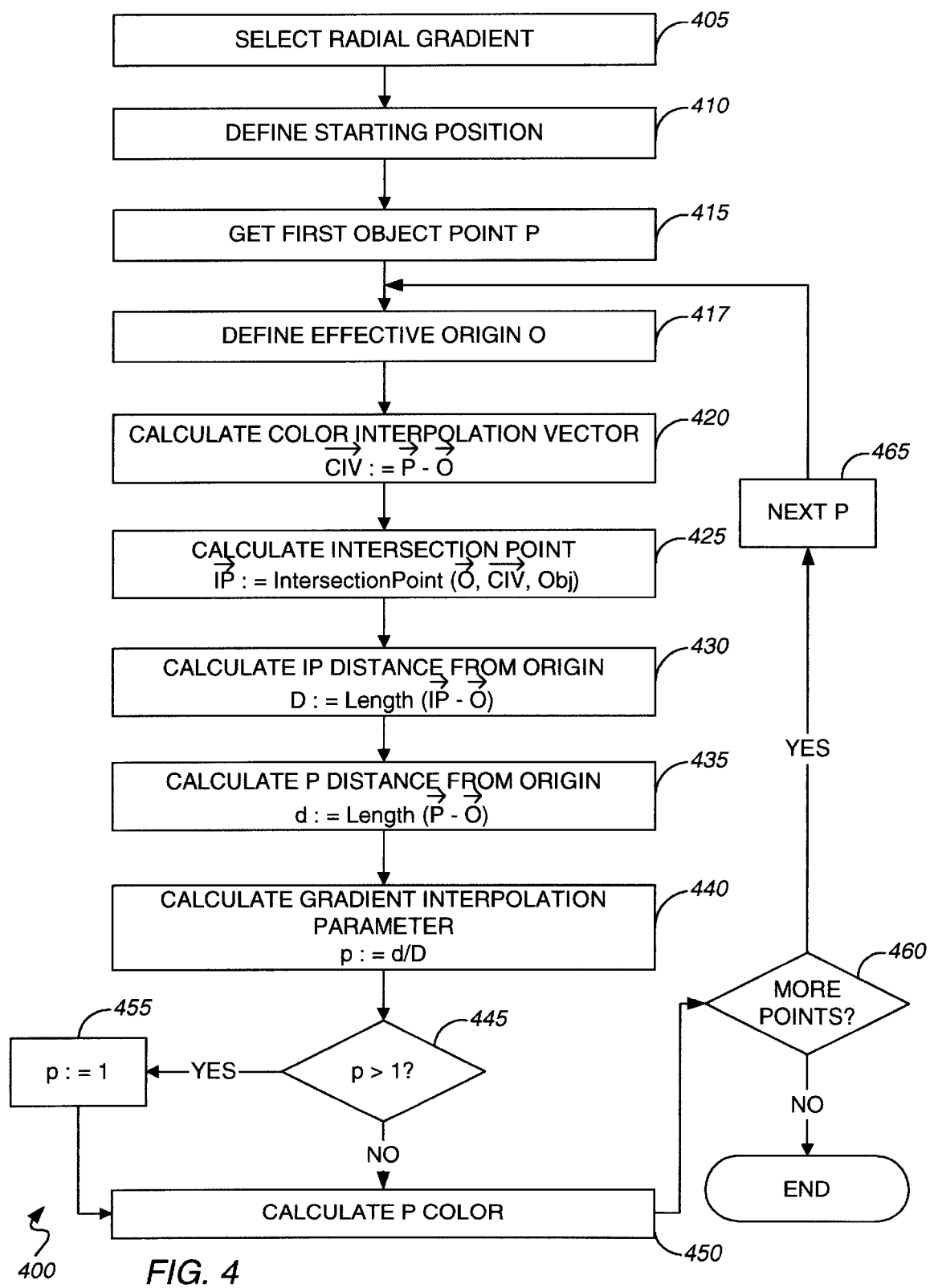
FIG. 4 is a flow diagram illustrating a method of applying a radial shape gradient.

System 100 performs a shaped gradient fill operation by applying the defined gradient to the selected object based at least in part on the selected object's shape (step 230). FIG. 4 illustrates in more detail one method 400 of applying a radial shape gradient as shown in FIG. 3A. The method begins when the user specifies a radial gradient and selects starting position (steps 405 and 410, respectively). The image processing program 130 iterates through each point in the object. For each point (for example, point 345 in FIG. 3A), image processing program 130 identifies an effective starting position (the "effective origin") (step 417). Where the starting position is a single point (e.g., a typical radial gradient), the effective origin will generally correspond to the specified starting point. Where the specified starting position includes multiple points, such as outline 330 in FIG. 3B, the effective origin is identified as a point included in the specified starting position—for example, the point on circle 330 closest to point 333 in FIG. 3B (although those of ordinary skill in the art will recognize that the effective origin can be identified using other tests based on known algorithms).

Image processing system 130 identifies a color interpolation vector 370 extending from the effective origin through the point in question to the line or lines corresponding to the ending position (step 520). In general, the color interpolation vector will be parallel to the gradient axis defined above. Alternatively, the color interpolation vector may extend in the general direction defined by the gradient axis, but not necessarily parallel to that axis, such as in the case where the effective origin is identified by locating the closest point in the effective starting position as described above. As in the case of a radial gradient, image processing programs 130 identifies the point at which the color interpolation vector meets the outline as an intersection point (IP) 375 (step 525), and calculates the distance D from the effective origin to the intersection point (step 530). This value is the gradient length for point 360 (and all other points that lie on the same color interpolation vector). As described above, image processing program 130 can be configured to identify the intersection point for complex or irregular objects based on a predetermined set of rules or an input from the user. Image processing program 130 calculates the distance d of the point 360 from the starting position (step 535) and calculates a gradient interpolation parameter p based on the ratio d/D (step 540), assigning a color for the current point 360 based on the parameter as described above (step 550). Image processing program 130 then repeats step 517 to 555 for a next point in the object unit it has iterated through and assigned colors for all points in the object.

Image processing program 130 also calculates a second distance d representing the distance of the point 345 from the effective origin (step 435). Image processing program 130 calculates a gradient interpolation parameter p based on the ratio d/D (step 440) and assigns a color for the current point 345 based on that parameter (step 450). The color can be assigned to the current point using a variety of known techniques, such as interpolation. One such technique based on linear interpolation is illustrated in the described in the pseudocode set out in Listing 1, below; other appropriate techniques will be apparent to those of ordinary skill in the art and can be selected based on the desired effect in a particular application.

Listing 1.

```
InterpolateGradientColor (p)
{
    //Consider a Gradient (G) of n colors C₁ ... Cₙ
    //Location of these colors L₁ ... Lₙ where Lᵢ >= 0 and Lᵢ <= 1, for
    all i from 1 ... n and Lᵢ <= Lᵢ₊₁
    if (p <= 0) then C := C₀
    else if ( p >= 1) then C := Cₙ
    else
    {
        //find the neighborhood (u) of p
        find an u such that Lᵤ <= p and Lᵤ₊₁ >= p
        if ((Lᵤ₊₁ = Lᵤ) or (p = Lᵤ)) then C := Cᵤ
        else
        {
            //Calculate Normalized Interpolation Parameter k := (p − Lᵤ) / (Lᵤ₊₁ − Lᵤ)

//Interpolate between colors Cu and Cu+1 for parameter k
            C := Cᵤ + (Cᵤ₊₁ − Cᵤ) * k
        }
    }
    return C
}
```

In some implementations, if the gradient interpolation parameter for a point is greater than 1 (corresponding, for example, to a point 355 located beyond the intersection point), the gradient interpolation parameter for the point is set to 1 (step 455), such that points located beyond the intersection point are all assigned the specified ending color in the gradient. Image processing program 130 then repeats steps 417 to 455 for a next point in the object until it has iterated through and assigned colors for all points in the object. Image processing system 100 can then process the image further—for example, by displaying the newly shaded object.

Figure 3C:
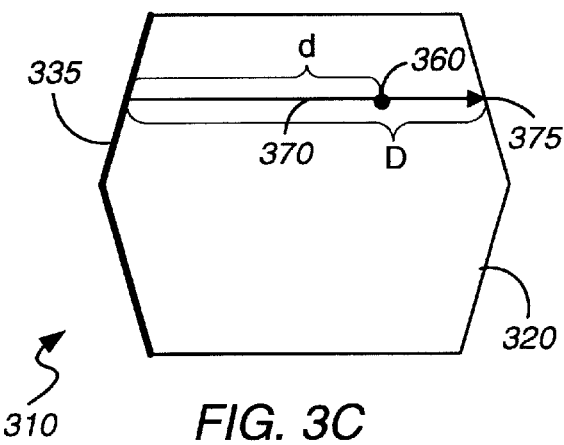
Figure 3D:
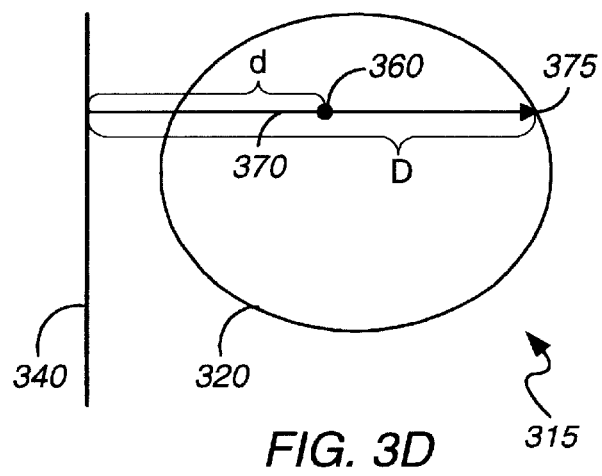
Figure 5:
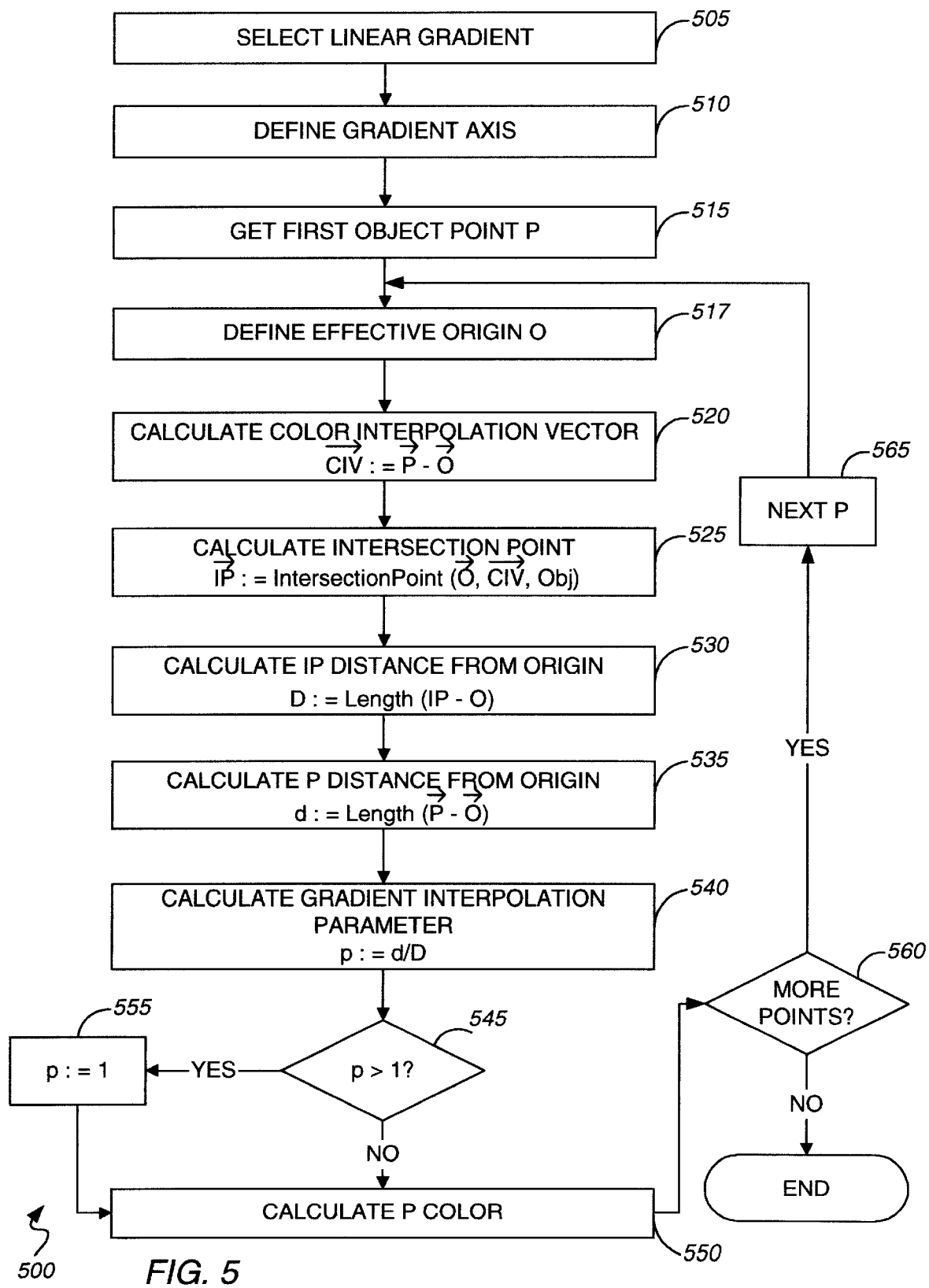
FIG. 5 is a flow diagram illustrating a method of applying a linear shape gradient.

A similar method 500 for applying a linear shape gradient, such as in the examples shown in FIGS. 3C and 3D, is illustrated in FIG. 5. The method begins when the user specifies a linear gradient (step 505). The user then selects a starting position and an ending position, which define the gradient axis for the linear gradient (step 510). For each point 360 within the object outline, image processing program 130 identifies an effective origin (step 517). For a typical linear shape gradient, image processing program 130 identifies the effective origin by identifying a line running through the point and lying parallel to the gradient axis. The effective origin is the point at which this line intersects with the line or lines corresponding to the starting position (e.g., lines 335 and 340 in FIGS. 3C and 3D, respectively). Alternatively, those of ordinary skill in the art will recognize that the effective origin for a linear shape gradient can be determined using other algorithms—for example, by identifying the point on the line or lines corresponding to the starting position that is closest to the point in question.

Image processing system 130 identifies a color interpolation vector 370 extending from the effective origin through the point in question to the line or lines corresponding to the ending position (step 520). In general, the color interpolation vector will be parallel to the gradient axis defined above. Alternatively, the color interpolation vector may extend in the general direction defined by the gradient axis, but not necessarily parallel to that axis, such as in the case where the effective origin is identified by locating the closest point in the effective starting position as described above. As in the case of a radial gradient, image processing program 130 identifies the point at which the color interpolation vector meets the outline as an intersection point (IP) 375 (step 525), and calculates the distance D from the effective origin to the intersection point (step 530). This value is the gradient length for point 360 (and all other points that lie on the same color interpolation vector). As described above, image processing program 130 can be configured to identify the intersection point for complex or irregular objects based on a predetermined set of rules or in input from the user. Image processing program 130 calculates representing the distance d of the point 360 from the starting position (step 535) and calculates a gradient interpolation parameter p based on the ratio d/D (step 540), assigning a color for the current point 360 based on that parameter as described above (step 550). Image processing program 130 then repeats steps 517 to 555 for a next point in the object until it has iterated through and assigned colors for all points in the object.

FIGS. 6, 7 and 8 illustrate a number of objects processed according to the shaped gradient fill methods described above. FIG. 6 illustrates three objects filled using a linear shape gradient extending from the left-hand portion of the object outline to the right-hand portion. FIG. 7 illustrates a number of objects, simple and complex, filled using radial shape gradients extending from an origin to the object outline. Finally, FIG. 8 contrasts a number of objects filled using conventional radial gradients with similar objects filled using the radial shape gradients described above.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of embodiments of the invention have been described. Nevertheless, it will be understood that various modifications may be made without departing from the spirit and scope of the invention. For example, while the steps of the various methods are described as being performed sequentially in a particular order, those skilled in the art will recognize that they can be performed in a different order and still fall within the scope of the invention. Accordingly, other embodiments are within the scope of the following claims.

What is claimed is:

1. A computer-implemented method of processing an image, the method comprising:
   receiving an input selecting in an image a region to be filled, an outline defining a shape of the selected region;
   receiving an input defining a gradient specifying a color transition to be applied between a starting position in the image and an ending position in the image; and
   applying the gradient between the starting position and the ending position by performing the following actions for each point inside the outline;
   identifying a color interpolation vector extending from an effective origin included in the starting position through the point to the ending position; and
   assigning a color for the point according to the gradient and based on the position of the point along the color interpolation vector relative to the effective origin and an intersection point where the color interpolation vector meets the outline.

2. The method of claim 1, wherein:
   the selected region is a vector object.

3. The method of claim 1, wherein:
   the selected region is a user selection.

4. The method of claim 1, wherein:
   the shape of the selected region is a regular shape.

5. The method of claim 1, wherein:
   the shape of the selected region is an irregular shape.

6. The method of claim 1, wherein:
   the shape of the selected region is a user-defined shape.

7. The method of claim 1, wherein:
   the gradient is a linear gradient.

8. The method of claim 1, wherein:
   the gradient is a radial gradient.

9. The method of claim 1, wherein:
   the starting position is a point located inside the outline or a point located outside the outline.

10. The method of claim 1, wherein:
    the starting position is a line that intersects the outline or a line that does not intersect the outline.

11. The method of claim 1, wherein:
    the starting position is a start outline defining a starting shape.

12. The method of claim 1, wherein:
    the starting position is defined by a user.

13. The method of claim 1, wherein:
    the ending position includes at least a portion of the outline.

14. The method of claim 7, wherein:
    the linear gradient is defined along a gradient axis extending from the stating position to the ending position; and
    the color interpolation vector is parallel to the gradient axis.

15. The method of claim 8, wherein:
    the starting position is a point; and
    the color interpolation vector extends radially from the starting position.

16. The method of claim 1, wherein:
    assigning a color for the point includes defining a gradient length for the color interpolation vector based on a distance between the starting position and the intersection point, defining a gradient interpolation parameter for the point by applying the defined gradient to the gradient length, and assigning a color for the point based on the gradient interpolation parameter.

17. The method of claim 16, wherein:
    the gradient interpolation parameter for a point represents the point's position along the color interpolation vector.

18. A computer-implemented method of shading a region in an image, the method comprising:
    receiving an input selecting in an image a region to be filled, an outline defining a shape of the selected region;
    receiving an input defining a color transition to be applied between an origin in the image and the outline; and
    applying a radial gradient to shade the selected region by (i) identifying for each point within the outline a color interpolation vector extending from the origin through the point to the outline, such that the color interpolation vector intersects the outline at one or more intersection points; and (ii) assigning a color for the point based on the point's position along the color interpolation vector relative to the origin and at least one intersection point.

19. A computer-implemented method of shading a region in an image, the method comprising:
    receiving an input selecting in an image a region to be filled, an outline defining a shape of the selected region;
    receiving an input defining a gradient axis extending from a starting position in the image to a portion of the outline, and a color transition to be applied along the gradient axis; and
    applying a linear gradient to shade the selected region by (i) identifying for each point within the, outline a color interpolation vector extending from an effective origin determined by the starting position through the point to the outline on a line parallel to the gradient axis, such that the color interpolation vector intersects the outline at one or more intersection points; and (ii) assigning a color for the point based on the point's position along the color interpolation vector relative to the effective origin and at least one intersection point.

20. A computer program product, tangibly stored on a computer-readable medium, for processing an image, the product comprising instructions operable to cause a programmable processor to:

receive an input selecting in an image a region to be filled, an outline defining a shape of the selected region;

receive an input defining a gradient specifying a color transition to be applied between a starting position in the image and an ending position in the image; and apply the gradient between the starting position and the ending position, wherein the instructions operable to cause a programmable processor to apply the gradient include, for each point inside the outline instructions operable to cause a programmable processor to:

identify a color interpolation vector extending from an effective origin included in the starting position through the point to the ending position; and assign a color for the point according to the gradient and based on the position of the point along the color interpolation vector relative to the effective origin and an intersection point where the color interpolation vector meets the outline.

21. The computer program product of claim 20, wherein: the selected region is a vector object.

22. The computer program product of claim 20, wherein: the selected region is a user selection.

23. The computer program product of claim 20, wherein: the shape of the selected region is a regular shape or an irregular shape.

24. The computer program product of claim 20, wherein: the shape of the selected region is a user-defined shape.

25. The computer program product of claim 20, wherein: the gradient is a linear gradient.

26. The computer program product of claim 20, wherein: the gradient is a radial gradient.

27. The computer program product of claimed 20, wherein:
the starting position is a point located inside the outline or a point located outside the outline.

28. The computer program product of claim 20, wherein: the starting position is a line that intersects the outline or a line that does not intersect the outline.

29. The computer program product of claim 20, wherein: the starting position is a start outline defining a starting shape.

30. The computer program product of claim 20, wherein: the starting position is defined by a user.

31. The computer program product of claim 20, wherein: the ending position includes at least a portion of the outline.

32. The computer program product of claim 25, wherein: the linear gradient is defined along a gradient axis extending from the starting position to the ending position; and the color interpolation vector is parallel to the gradient axis.

33. The computer program product of claim 26, wherein: the starting position is a point; and the color interpolation vector extends radially from the starting position.

34. The computer program product of claim 20, wherein the instructions operable to cause a programmable processor to assign a color for the point include instructions operable to cause a programmable processor to:
define a gradient length for the color interpolation vector based on a distance between the starting position and the intersection point;
define a gradient interpolation parameter for the point by applying the defined gradient to the gradient length; and
assign a color for the point based on the gradient interpolation parameter.

35. The computer program product of claim 34, wherein: the gradient interpolation parameter for a point represents the point's position along the color interpolation vector.

36. A computer program product, tangibly stored on a computer-readable medium, for shading a region in an image, the product comprising instructions operable to cause a programmable processor to:
receive an input selecting in an image a region to be filled, an outline defining a shape of the selected region;
receive an input defining a color transition to be applied between an origin in the image and the outline; and
apply a radial gradient to shade each point within the selected region, the instructions operable to cause a programmable processor to apply a radial gradient including, for each point within the selected region, instructions operable to cause a programmable processor to:
identify a color interpolation vector extending from the origin through the point to the outline, such that the color interpolation vector intersects the outline at one or more intersection points; and
assign a color for the point based on the point's position along the color interpolation vector relative to the origin and at least one intersection point.

37. A computer program product, tangibly stored on a computer-readable medium, for shading a region in an image, the product comprising instructions operable to cause a programmable processor to:
receive an input selecting in an image a region to be filled, an outline defining a shape of the selected region;
receive an input defining a gradient axis extending from a starting position in the image to a portion of the outline, and a color transition to be applied along the gradient axis; and
apply a linear gradient to shade each point within the selected region, the instructions operable to cause a programmable processor to apply a linear gradient including, for each point within the selected region, instructions operable to cause a programmable processor to:
identify a color interpolation vector extending from an effective origin determined by the starting position through the point to the outline on a line parallel to the gradient axis, such that the color interpolation vector intersects the outline at one or more intersection points; and assign a color for the point based on the point's position along the color interpolation vector relative to the effective origin and at least one intersection point.

38. The method of claim 18, wherein:

assigning a color for the point includes assigning a color for the point based on the point's position along the color interpolation vector relative to the intersection point that is closest to the origin.

39. The method of claim 19, wherein:

assigning, a color for the point includes assigning a color for the point based on the point's position along the color interpolation vector relative to the intersection point that is closest to the starting position.

40. The computer program product of claim 36, wherein the instructions operable to cause a programmable processor to assign a color include instructions operable to cause a programmable processor to:

assign a color for the point based on the point's position along the color interpolation vector relative to the intersection point that is closest to the origin.

41. The computer program product of claims 37, wherein the instructions operable to cause a programmable processor to assign a color include instructions operable to cause a programmable processor to:

assign a color for the point based on the point's position along the color interpolation vector relative to the intersection point that is closest to the starting position.

* * * * *

UNITED STATES PATENT AND TRADEMARK OFFICE
CERTIFICATE OF CORRECTION

PATENT NO. : 6,870,954 B1
DATED : March 22, 2005
INVENTOR(S) : Niraj Gupta

It is certified that error appears in the above-identified patent and that said Letters Patent is hereby corrected as shown below:

Column 8,
Line 60, after "the", delete ",";

Column 9,
Line 17, after "outline", insert -- , --;

Column 11,
Line 10, after "assigning", delete ",";

Column 12,
Line 6, delete "claims" and replace with -- claim --.

Signed and Sealed this

Twenty-eighth Day of June, 2005

JON W. DUDAS
*Director of the United States Patent and Trademark Office*